United States Patent [19]

Bender et al.

[11] Patent Number: 4,898,361
[45] Date of Patent: Feb. 6, 1990

[54] SUBMODULATION OF A PULSE-WIDTH-MODULATED SOLENOID CONTROL VALVE

[75] Inventors: James G. Bender, Carmel, Ind.; Lee F. Herron, Santa Barbara, Calif.; Keith D. Struthers, Carmel, Ind.

[73] Assignees: General Motors Corporation, Detroit, Mich.; Delco Electronics Corporation, Kokomo, Ind.

[21] Appl. No.: 345,054

[22] Filed: Apr. 28, 1989

[51] Int. Cl.⁴ .............................. F16K 31/06
[52] U.S. Cl. ..................... 251/129.05; 74/844; 361/152; 361/154; 137/625.64; 251/129.08
[58] Field of Search ............ 251/129.05, 129.08; 74/844; 361/154, 152; 137/625.64

[56] References Cited

U.S. PATENT DOCUMENTS

| | | |
|---|---|---|
| 4,031,782 | 6/1977 | Miller et al. |
| 4,173,031 | 10/1979 | Leichle ............... 361/154 X |
| 4,266,261 | 5/1981 | Streit et al. ............ 361/154 |
| 4,373,697 | 2/1983 | Phelps .............. 251/129.05 |
| 4,452,210 | 6/1984 | Sasayama et al. ...... 361/154 X |
| 4,479,161 | 10/1984 | Henrich et al. ............ 351/154 |
| 4,511,945 | 4/1985 | Nielsen ............... 361/154 |
| 4,520,420 | 5/1985 | Ariyoshi et al. .......... 361/154 |
| 4,536,818 | 8/1985 | Nielsen ............... 361/154 |

Primary Examiner—Arnold Rosenthal
Attorney, Agent, or Firm—Mark A. Navarre

[57] ABSTRACT

A PWM solenoid operated valve control arrangement which substantially eliminates supply voltage dependent variability of the valve without the expense or inefficiency of a conventional voltage regulator. The coil of the solenoid valve is pulse-width-modulated in relation to the commanded output result and the energization periods are submodulated in relation to the magnitude of the supply voltage. The effective voltage applied to the coil, and hence the operating characteristics of the solenoid valve, are thereby made substantially independent of supply voltage variations.

3 Claims, 5 Drawing Sheets

| RANGE | CLUTCHES APPLIED | | | | |
|---|---|---|---|---|---|
| | C1 | C2 | C3 | C4 | C5 |
| FWD 1 | X | | | | X |
| 2 | X | | | X | |
| 3 | X | | X | | |
| 4 | X | X | | | |
| 5 | | X | X | | |
| 6 | | X | | X | |
| REV 1 | | | X | | X |
FIG.1b
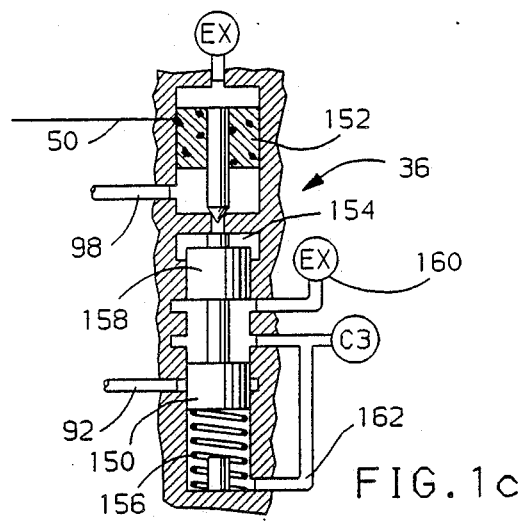
FIG.1c
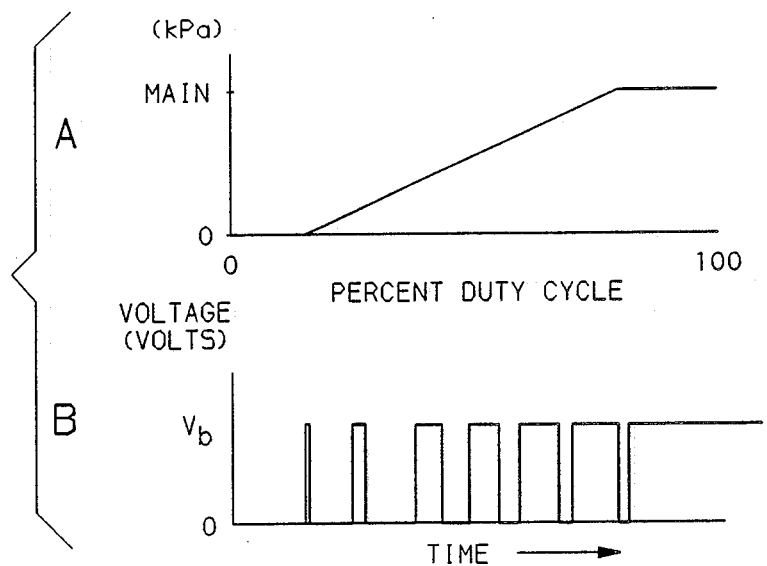
FIG.2

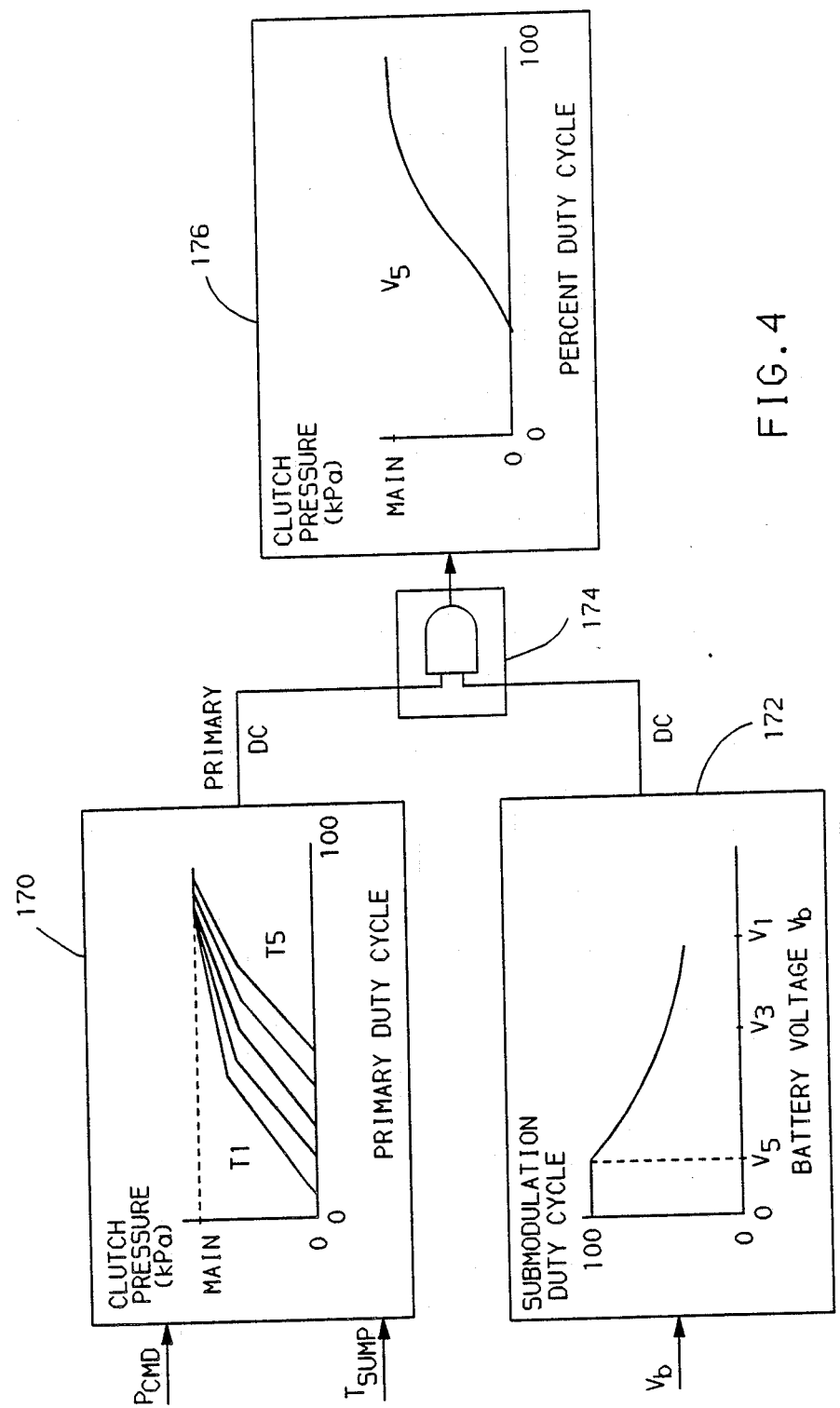

SUBMODULATION OF A PULSE-WIDTH-MODULATED SOLENOID CONTROL VALVE

This invention relates to the control of a motor vehicle system having an electro-hydraulic pressure control valve, and more particularly to a control which compensates for variations in the system supply voltage.

BACKGROUND OF THE INVENTION

The achievement of accurate and repeatable fluid pressure regulation with electro-hydraulic valves in a motor vehicle environment poses a difficult control problem. In particular, the operating characteristics of such valves vary dramatically with the system supply voltage. In the past, this variability has been dealt with by independently regulating the supply voltage or by employing current limiting to protect the solenoid coil from damage due to overvoltage.

SUMMARY OF THE PRESENT INVENTION

The present invention is directed to a control which substantially eliminates the voltage-dependent variability of the valve without the expense or inefficiency of a conventional voltage regulator. The energization of the solenoid coil of the valve is pulse-width-modulated at a relatively low frequency primary duty cycle determined in relation to the commanded output pressure, and the energization periods are submodulated at a duty cycle determined in relation to the magnitude of the system supply voltage. The effective voltage applied to the coil, and hence the operating characteristics of the valve, are thereby substantially independent of supply voltage variations.

In a mechanization of the present invention, the subject submodulation technique enabled a single solenoid driver and valve to be used with either a 12-volt or a 24-volt vehicle electrical system. The technique may also be used to achieve other related control objectives, such as reduction of the power dissipated by a solenoid when primary modulation of the valve is no longer required.

BRIEF DESCRIPTION OF THE DRAWINGS

FIG. 1b is a diagram illustrating the clutch engagements required to establish the various speed ratios of the transmission depicted in FIG. 1a.

FIG. 1c is a diagram of a representative solenoid operated fluid pressure control valve referenced in FIG. 1a.

FIG. 2 is a graphical representation of a desired pressure response characteristic of the solenoid operated fluid pressure control valves of FIG. 1a. Graph A illustrates desired output pressure and Graph B illustrates the corresponding voltage pulse-width-modulation.

FIG. 4 is a block diagram of a control system according to this invention in which the primary pulse-width-modulation duty cycle is submodulated in relation to the system supply voltage to achieve a substantially constant pressure response characteristic regardless of supply voltage variation.

DETAILED DESCRIPTION OF THE INVENTION

Figure 1A:
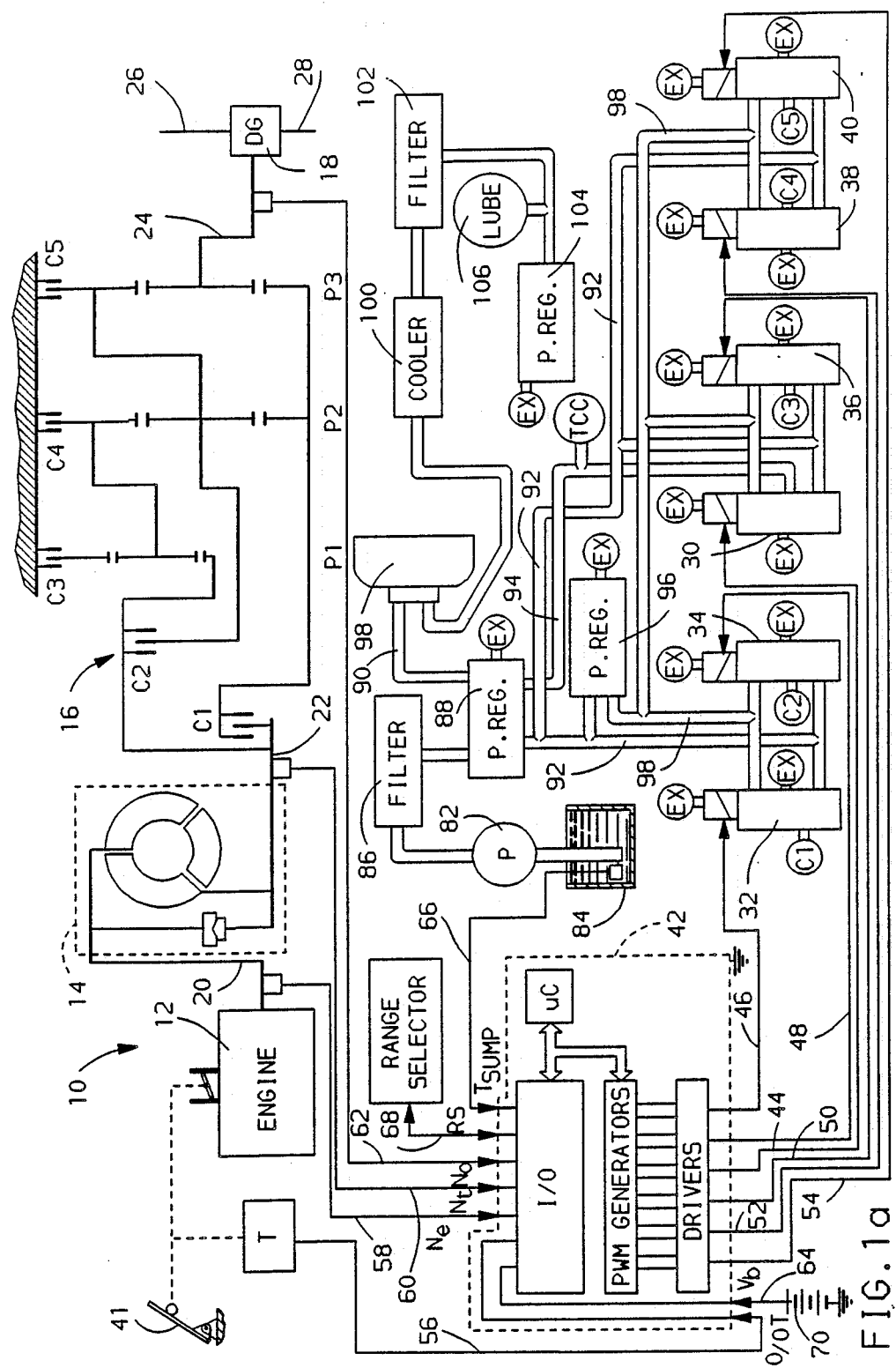
FIG. 1a is a system diagram of a fluid operated motor vehicle transmission, including several solenoid operated fluid pressure control valves and a computer-based control unit for carrying out the voltage control technique of this invention.

Referring now to the drawings, and more particularly to FIG. 1a, the reference numeral 10 generally designates a motor vehicle drivetrain including a throttled internal combustion engine 12, a fluidic torque converter 14, a six-speed fluid operated power transmission 16 and a differential gearset (DG) 18. The engine 12 is connected to the torque converter 14 via shaft 20, the torque converter 14 is connected to the transmission 16 via shaft 22, the transmission 16 is connected to the differential gearset 18 via shaft 24 and the differential gearset is connected to a pair of drive wheels (not shown) via the prop shafts 26 and 28.

The speed and torque relationships between the engine 12 and the drive wheels of the vehicle are controlled by a fluid operated torque converter clutch, designated TCC, and five fluid operated transmission clutches, designated C1–C5. The torque converter clutch TCC is selectively engaged by the solenoid operated control valve 30 to mechanically connect the impeller I and turbine T of torque converter 14. The clutches TCC, C1, C2, C3, C4, C5 are selectively engaged and disengaged by the solenoid operated control valves 30, 32, 34, 36, 38, 40 according to the diagram shown in FIG. 1b, to selectively establish a desired transmission speed ratio. The illustrated transmission gearset provides one reverse ratio and six forward ratios, and is described in detail in the U.S. Pat. No. 4,070,927 to Polak, issued Jan. 31, 1978, and assigned to the assignee of the present invention. An operator manipulated accelerator pedal 41 positions the engine throttle for controlling the engine power output.

The operation of the solenoid operated control valves 30–40 is controlled by a computer-based control unit 42 via lines 44–54 in response to various input signals representative of system parameters. Such inputs include an engine throttle position signal %T on line 56, an engine output shaft speed signal $N_e$ on line 58, a torque converter output shaft speed signal $N_t$ on line 60, a transmission output shaft speed signal $N_o$ on line 62, a system supply voltage signal $V_b$ on line 64, a transmission fluid temperature signal $T_{sump}$ on line 66 and an operator range selector position signal RS on line 68. The system voltage is supplied by the storage battery 70, and the input signals are obtained with conventional electrical transducers such as potentiometers, thermisters and magnetic speed pickups.

Internally, the control unit 42 comprises a number of conventional devices including a microcomputer (uC) with internal clock and memory, an input/output device (I/0) and an array of PWM generators (PWM) and drivers (DR). As indicated below, two PWM generators (PWM) and one driver (DR) are dedicated to each submodulated solenoid control valve 30-40. The PWM outputs are combined in the respective drivers (DR) by a logical AND function, and the resulting signal is used to energize the respective solenoid control valve.

The hydraulic circuit of transmission 16 is designated generally by the reference numeral 80 and includes a positive displacement pump 82 for supplying pressurized hydraulic fluid from the sump or reservoir 84, to the clutches TCC and C1-C5 through various hydraulic and electro-hydraulic valving mechanisms. After passing through a main circuit filter 86, the fluid output of pump 82 is directed to a main pressure regulator valve 88 which develops regulated fluid pressures in lines 90, 92 and 94.

The fluid in line 90, generally referred to as converter feed pressure, is directed through the torque converter 14, as schematically designated by the converter shell 98. After passing through a cooler 100 and cooler filter 102, the converter fluid is then regulated down to a lower pressure by the regulator valve 104 and directed to the transmission tube circuit, as designated by the bubble 106.

The fluid in line 92, generally referred to as main or line pressure, is supplied as an input to the clutch control valves 30-40, and also to the control pressure regulator valve 96. The control pressure regulator valve 96 develops a somewhat lower pressure in line 98, referred to herein as the control pressure, such pressure being directed to the solenoid of each control valve 30-40 as described below in reference to FIG. 1c.

The fluid in line 94, referred to as the converter clutch pressure, is supplied directly by solenoid 30 to the torque converter clutch TCC to engage the same. This pressure is also supplied to the main regulator valve 88 to provide a lower regulated line pressure in the converter lock-up mode.

As exemplified by the valve 36 in FIG. 1c, each clutch control valve 30-40 includes a pressure-balanced spool valve 150 and a pulse-width-modulated (PWM) solenoid valve 152 for variably connecting the control pressure in line 98 to a pilot chamber 154 of valve 150. The fluid pressure in the pilot chamber 154 produces a force which opposes the force of spring 156 and the feedback pressure 162; the result of such forces determines the position of the spool 158, and hence, the degree of communication between the main pressure supply line 92 and the respective clutches TCC and C1-C5. When the solenoid valve 152 is deenergized, the fluid pressure in the chamber 154 is exhausted, and the spring 156 urges the spool 158 upward to exhaust the clutch pressure via exhaust port 160. When the solenoid valve 152 is energized at a relatively low PWM duty cycle, the spool 158 moves downward, partially cutting off the exhaust port 160 and partially uncovering the main pressure supply line 92. As the PWM duty cycle is increased, the spool 158 continues to move downward, increasing the clutch pressure, until the exhaust port 160 is fully cut off and the main pressure supply line 92 is fully uncovered.

The above relationship between PWM duty cycle and clutch pressure is graphically illustrated in FIG. 2. In particular, Graph A depicts the clutch pressure generated for the increasing PWM duty cycles depicted in Graph B. As indicated in Graph B, the solenoid valve is energized with modulated battery voltage $V_b$ and the clutch pressure is variable up to the main supply pressure MAIN.

Figure 3:
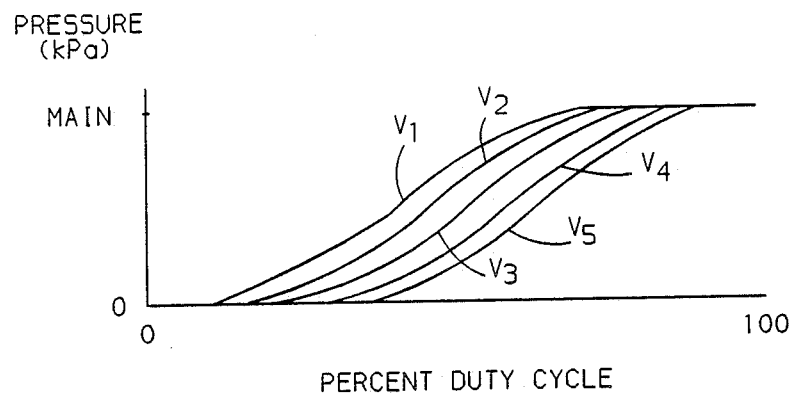
FIG. 3 graphically illustrates the variation in the operating characteristics of the control valves with variations in the system supply voltage without the submodulation control of this invention.

Significantly, the pressure v. duty cycle relationship depicted in FIG. 2 is specific to a given terminal voltage of battery 70. For a given PWM duty cycle, a higher battery voltage will increase the clutch pressure and a lower battery voltage will decrease the clutch pressure. So in practice, the solenoid control valves 30-40 can be characterized by a family of pressure v. duty cycle traces as shown in FIG. 3. Each trace of FIG. 3 corresponds to a different battery supply voltage $V_1$, $V_2$, $V_3$, $V_4$, $V_5$, the voltages $V_1$ and $V_5$ representing the uppermost and lowermost excursions, respectively, of the battery voltage $V_b$. The variability is especially significant when it is considered that the transmission 14 can be installed in either 12-volt or 24-volt electrical systems.

The primary object of this invention is to control the energization of the solenoid control valves 30-40 so that they exhibit substantially a given pressure v. duty cycle characteristic regardless of the system supply voltage. As indicated above, this object is achieved according to this invention by submodulating the primary PWM duty cycle in relation to the magnitude of the system supply voltage, as indicated in the system diagram of FIG. 4. As indicated in that Figure by the block 170, the primary PWM frequency is relatively low, such as 100 Hz, and the on-time/off-time duty cycle is determined as a function of a pressure command for the respective clutch. The fluid temperature $T_{sump}$ may also be a factor, as indicated. As indicated by the block 172, the submodulation PWM frequency is relatively high, such as 2 kHz, and the on-time/off-time duty cycle is determined as a function of the battery voltage $V_b$. The primary and submodulation duty cycles are combined by a logical AND function as indicated by the block 174 to form an output signal for controlling the application of the battery voltage $V_b$ to the respective solenoid valves.

Figure 5:
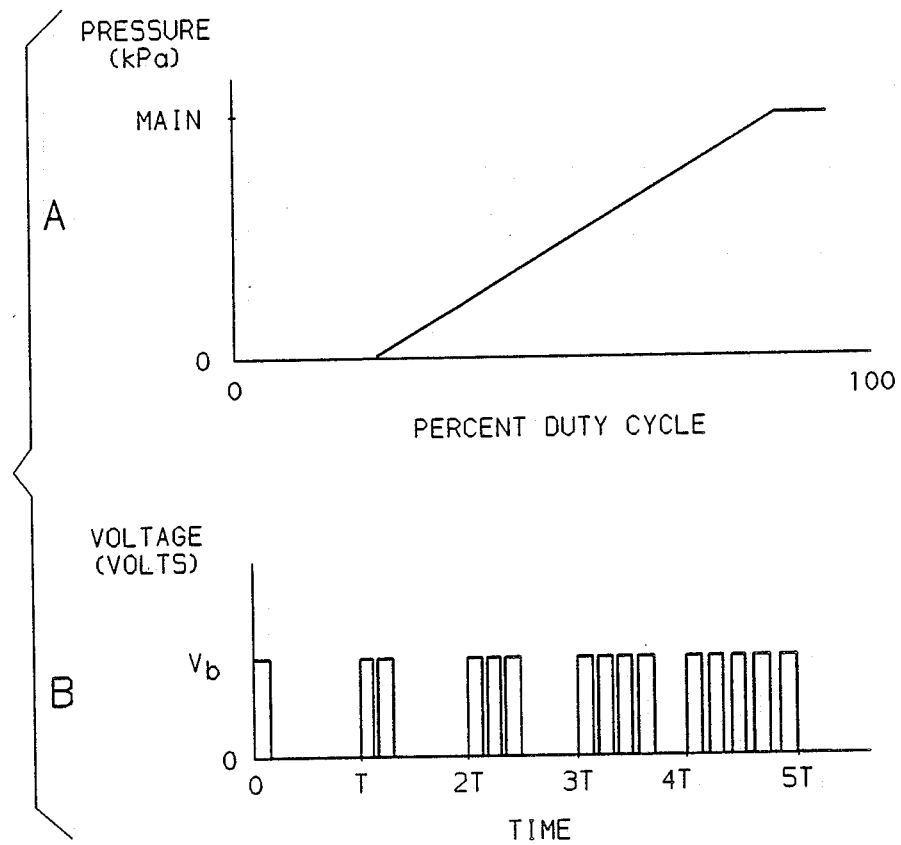
FIG. 5 graphically illustrates an example of how the pressure response characteristic of FIG. 2 is achieved at a higher system supply voltage, using the submodulation technique of this invention. Graph A illustrates desired output pressure and Graph B illustrates the corresponding primary and submodulated voltage.

An example of the PWM energization for a given battery voltage is graphically illustrated in FIG. 5. Graph A depicts the desired pressure v. primary duty cycle characteristic, and Graph B shows how the various primary duty cycles are submodulated to provide the proper energization of the respective solenoid valve.

Since submodulation reduces the effective energization dictated by the primary duty cycle, the desired pressure v. primary duty cycle characteristic is preferably chosen to correspond substantially to that which would occur at the lowermost excursion of the battery voltage—that is, $V_5$ in FIG. 3. Thus, as indicated at block 172 of FIG. 4, the submodulation duty cycle is 100% for battery voltages of $V_5$ or less, and progressively less than 100% for battery voltages greater than $V_5$. Effectively, the lower the submodulation duty cycle, the lower the energization of the respective solenoid valve. The end result is that the clutch control valve always produces the desired pressure v. primary duty cycle characteristic regardless of the system supply voltage, as indicated in FIG. 4 by the block 176.

As with the primary duty cycle information, the submodulation duty cycle information is stored in the microcomputer memory of control unit 42 in the form of a conventional look-up table. The primary duty cycle look-up table is addressable as a function of the desired pressure, and the submodulation duty cycle look-up table is addressable as a function of the battery terminal voltage $V_b$.

Figure 6:
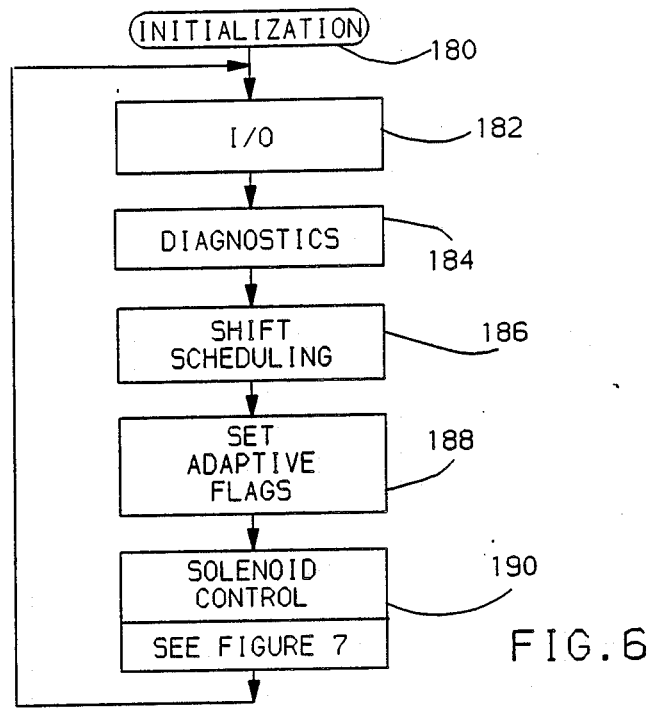
FIGS. 6 and 7 are flow diagrams representative of computer program instructions executed by the computer-based controller of FIG. 1a in carrying out the submodulation voltage control of this invention.
Figure 7:
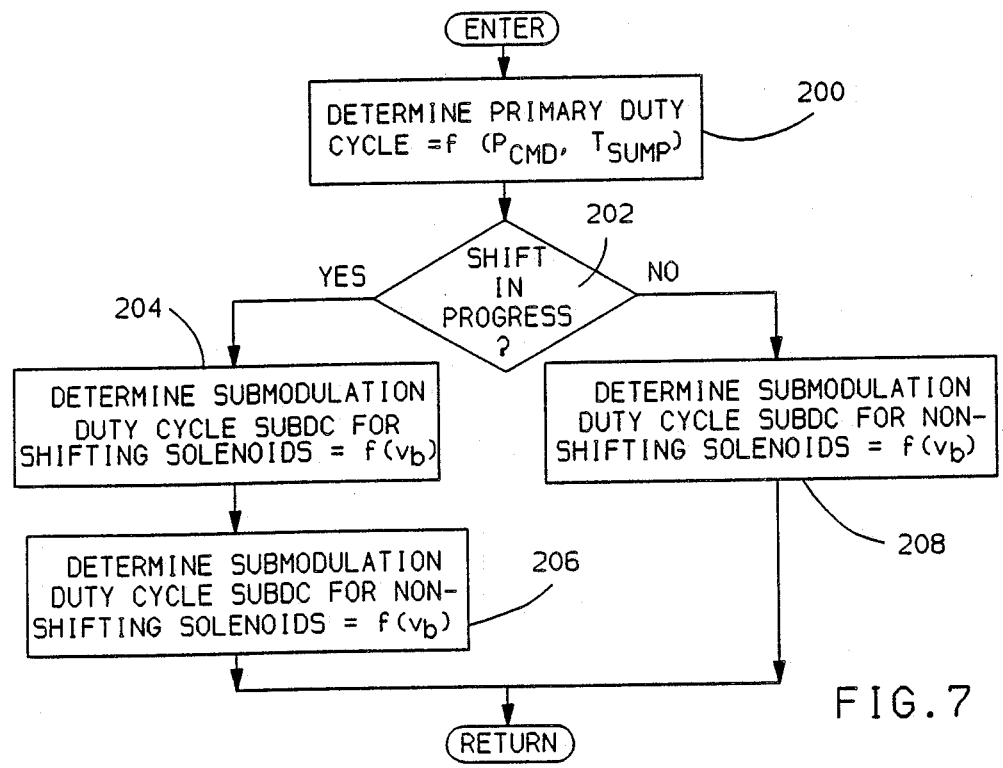

FIGS. 6 and 7 are flow diagrams representative of computer program instructions executed by the computer-based control unit 42 of FIG. 1 in carrying out the submodulation control technique of this invention. FIG. 6 represents an executive or main loop program which directs the sequential execution of various subroutines, one of which is depicted in greater detail in the flow diagram of FIG. 7.

Block 180 designates a series of instructions executed at the initiation of each period of vehicle operation for setting the various timers, registers and variable values of control unit 42 to predetermined initial values. Thereafter, the blocks 182–190 are sequentially and repeatedly executed as indicated by the flow diagram lines. Block 182 reads the various input signal values and outputs the required control signals to the PWM generators and drivers for solenoid controlled valves 30–40. Blocks 184–188 analyze the various system input signals described above in reference to FIG. 1a and develop pressure command signals $P_{CMD}$ for application to the solenoid operated control valves at the next execution of block 182. Block 190 (SOLENOID CONTROL) performs the control functions 170 and 172 described above in reference to the control system diagram of FIG. 4 and is further detailed in the flow diagram of FIG. 7 as indicated.

As indicated by the instruction block 200 in FIG. 7, the first step of the SOLENOID CONTROL routine is the determination of the primary PWM duty cycles PDCTCC, and PDC1–PDC5 for the various solenoid controlled valves 30–40. Such duty cycles are determined as described above in reference to FIG. 4 as a function of the respective clutch pressure commands $P_{CMDTCC}$ and $P_{CMD1}$–$P_{CMD5}$ and the fluid temperature $T_{sump}$ in the transmission sump 84. In practice, values such as those shown in FIG. 4 can be stored in a two dimensional look-up table in the memory of the microcomputer (uC) of control unit 42.

Then, the blocks 202–208 are executed to determine the submodulation PWM duty cycles SUBDCTCC and SUBDC1–SUBDC5. If a transmission shift is in progress, as determined by the decision block 202, the blocks 204 and 206 are executed to separately determine the submodulation duty cycles for the shifting and nonshifting solenoid valves. The shifting solenoid valves—that is, the solenoid valves which control the fluid pressures in oncoming and offgoing clutches—are submodulated at a voltage-dependent duty cycle as described above in reference to FIG. 4.

The nonshifting solenoid valves—that is, the solenoid valves which control the fluid pressures in disengaged or fully engaged clutches—are submodulated at a voltage-dependent duty cycle chosen in relation to the desired solenoid current level. The normally closed nonshifting valves are submodulated at a relatively low voltage-dependent duty cycle to reduce the power to that required to hold such valves in the open (hydraulic-on) state. The normally open nonshifting valves are submodulated at a somewhat higher voltage-dependent duty cycle, but lower than that required for shifting, chosen to maintain sufficient current to return the valve to the closed (hydraulic-off) state in the event of a momentary loss of battery voltage.

If a shift is not in progress, all of the valves are nonshifting valves and the block 208 is executed to determine the submodulation duty cycles as described above in reference to the block 206.

Thereafter the block 182 of FIG. 6 outputs the various primary and submodulation duty cycles to the PWM generators and drivers of control unit 42. For each submodulated valve 30–40, a first PWM generator develops a PWM waveform in accordance with the primary duty cycle at the primary frequency, and a second PWM generator develops a PWM waveform in accordance with the submodulation duty cycle at the submodulation frequency. As indicated in Graph B of FIG. 5, the submodulation frequency is substantially greater than the primary modulation frequency. The primary and submodulation duty cycles are then combined in the respective driver circuit (DR) by a logical AND function as indicated by the block 174 in FIG. 4 and amplified to correspondingly energize the solenoid valve.

While this invention has been described in reference to the illustrated embodiment, it is expected that various modifications will occur to those skilled in the art. In this regard, it should be understood that the present invention is defined by the appended claims, and that controls incorporating one or more of the modifications may still fall within the scope of such claims.

The embodiments of the invention in which an exclusive property or privilege is claimed are defined as follows:

1. Fluid pressure control apparatus for generating a desired fluid pressure in a control chamber of a motor vehicle transmission, comprising:
   a source of fluid pressure;
   electrically energizable solenoid operated valve means adapted to alternately connect and disconnect said source and said control chamber in accordance with such energization;
   a source of direct voltage including a storage battery, having a terminal voltage which varies depending on vehicle operation;
   control means for (1) developing a relatively low frequency PWM valve energization signal having an on-time/off-time duty cycle which if applied to the valve would produce the desired pressure in said control chamber when the terminal voltage of said source is relatively low, and (2) submodulating the on-time of said energization signal in relation to the actual terminal voltage of said source so as to effectively reduce said on-time when the actual source voltage is greater than said relatively low source voltage; and
   driver means for energizing the solenoid operated valve means with said source of direct voltage in accordance with the submodulated valve energization signal.

2. Fluid pressure control apparatus for generating a desired fluid pressure in a control chamber of a motor vehicle transmission, comprising:
   a source of fluid pressure;
   electrically energizable solenoid operated valve means adapted to alternately connect and disconnect said source and said control chamber in accordance with such energization;
   a source of direct voltage including a storage battery, having a terminal voltage which varies depending on vehicle operation;
   driver means for energizing the solenoid operated valve means with said source of direct voltage in accordance with an on/off control signal applied thereto;

control means including primary modulation look-up means for providing a relatively low frequency PWM duty cycle command for said valve means as a function of the desired fluid pressure, assuming a relatively low terminal voltage of said source, and submodulation look-up means for providing a relatively high frequency PWM duty cycle command as a function of the actual terminal voltage of said source; and PWM means for combining the PWM duty cycle commands provided by said primary modulation and submodulation look-up means to form an on-/off control signal for said driver means, whereby the solenoid valve is variably energized to produce the desired pressure in said control chamber regardless of the terminal voltage of said source.

3. The apparatus set forth in claim 2, wherein the PWM means combines the PWM duty cycle commands provided by said primary modulation and submodulation look-up means by a logical AND operation.

* * * * *